Oct. 27, 1970   A. MICHELSON ET AL   3,535,761
METHOD OF FABRICATING RADIATORS
Filed Aug. 30, 1967   6 Sheets-Sheet 1
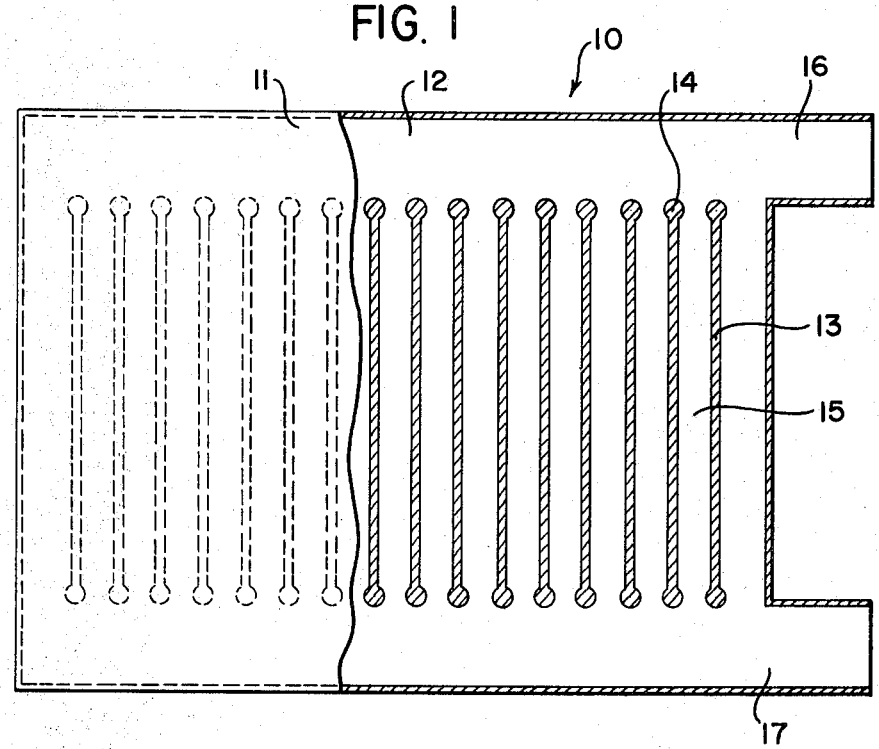
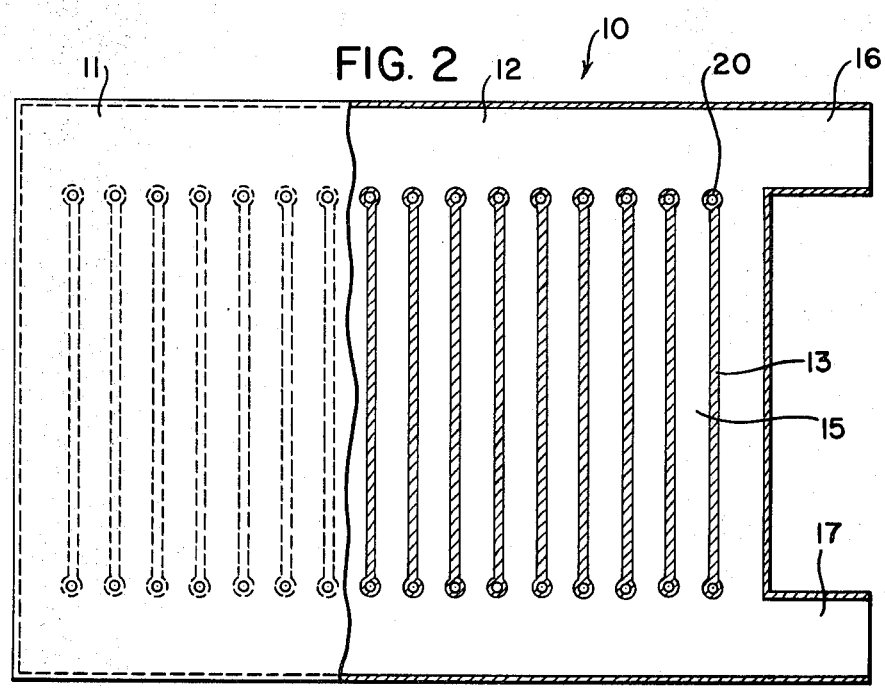
INVENTORS.
ANATOL MICHELSON &
MELVIN I. WEISS
BY
Meyer, Tilberry & Body
ATTORNEYS

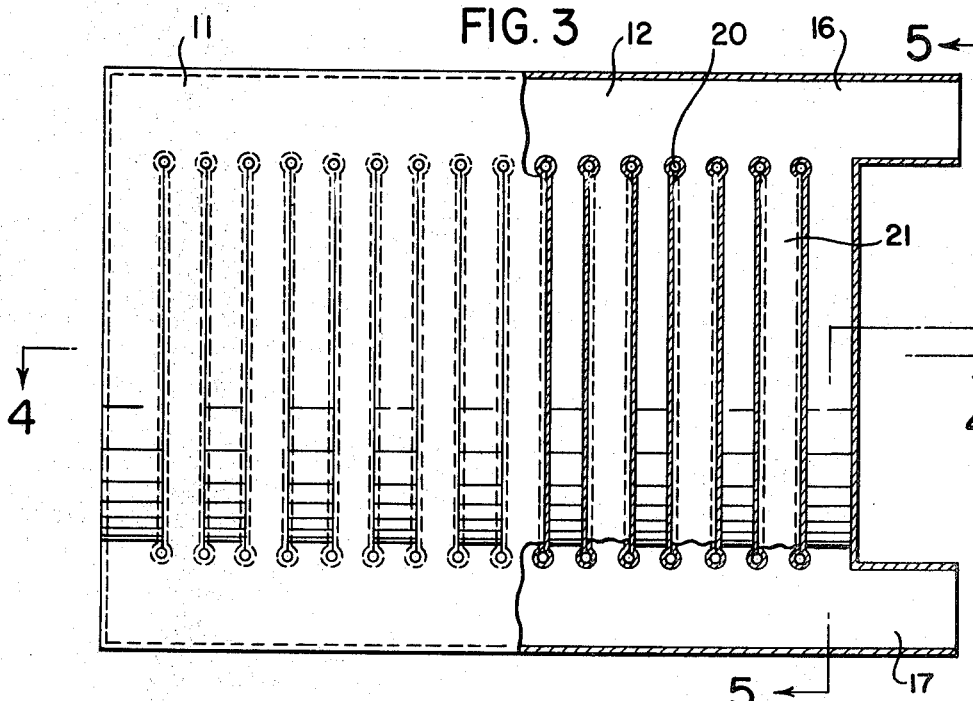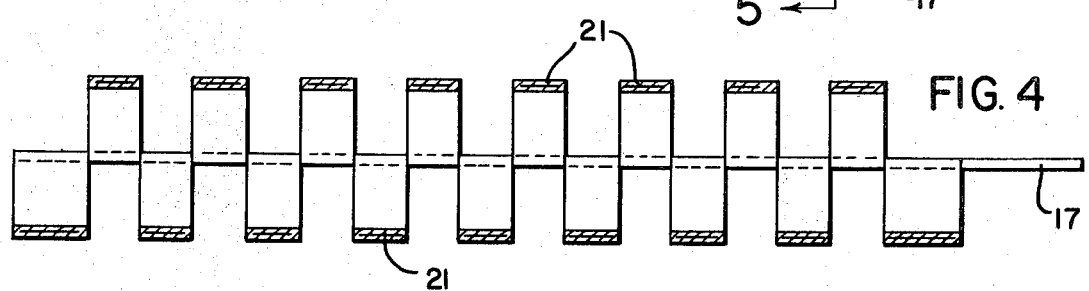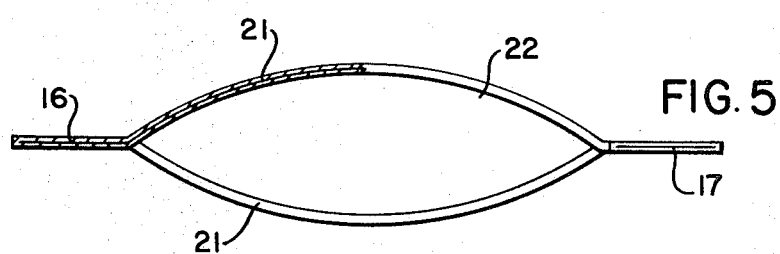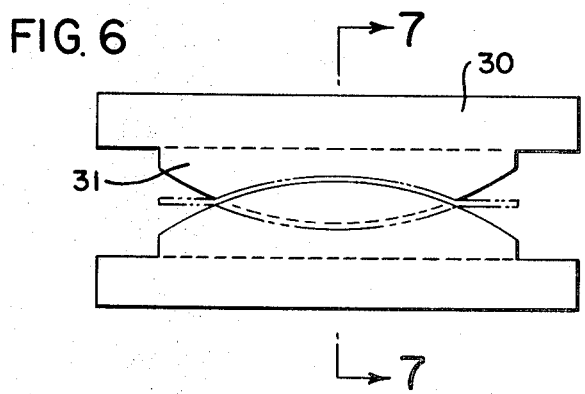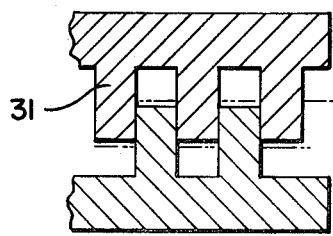

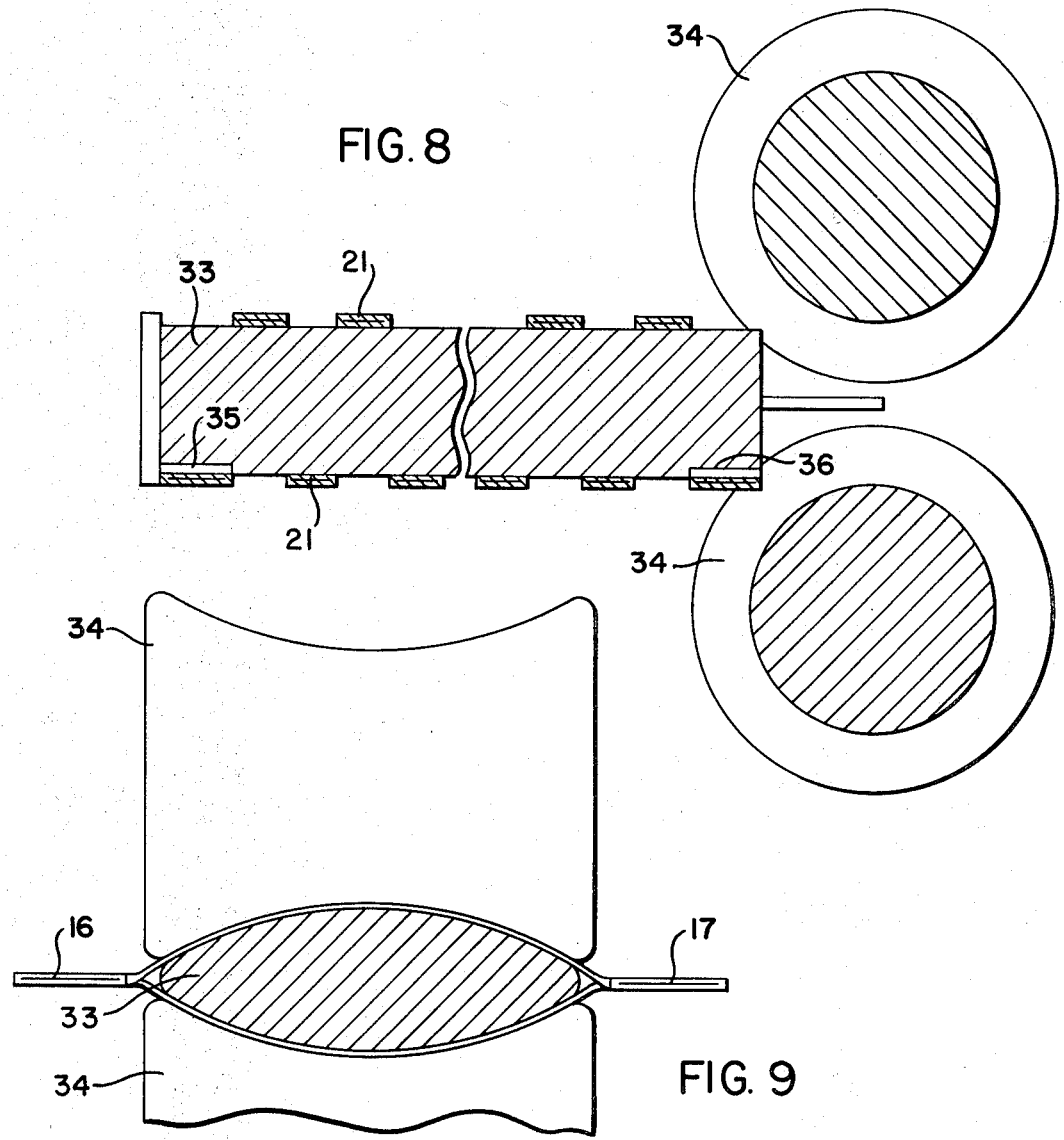
FIG. 8
FIG. 9
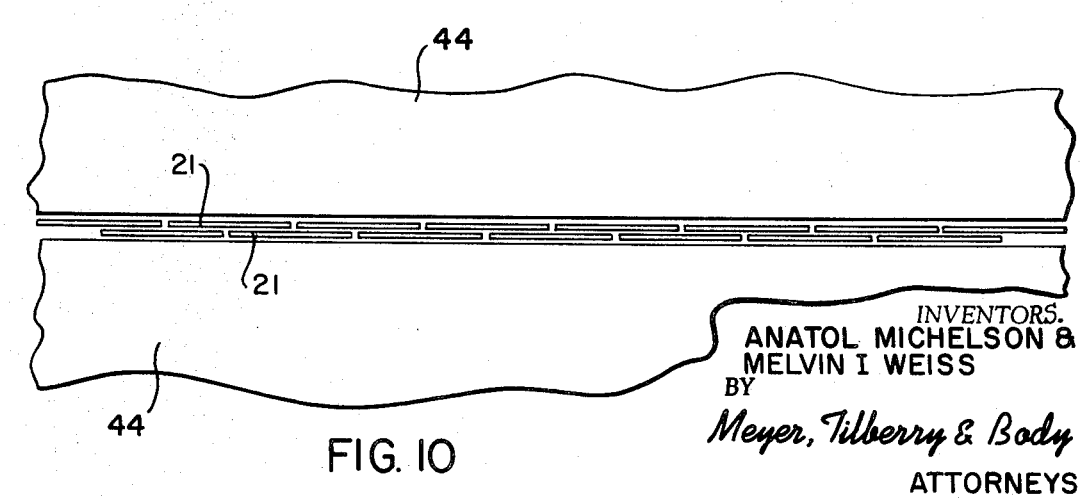
FIG. 10

Oct. 27, 1970 A. MICHELSON ET AL 3,535,761
METHOD OF FABRICATING RADIATORS
Filed Aug. 30, 1967 6 Sheets-Sheet 4
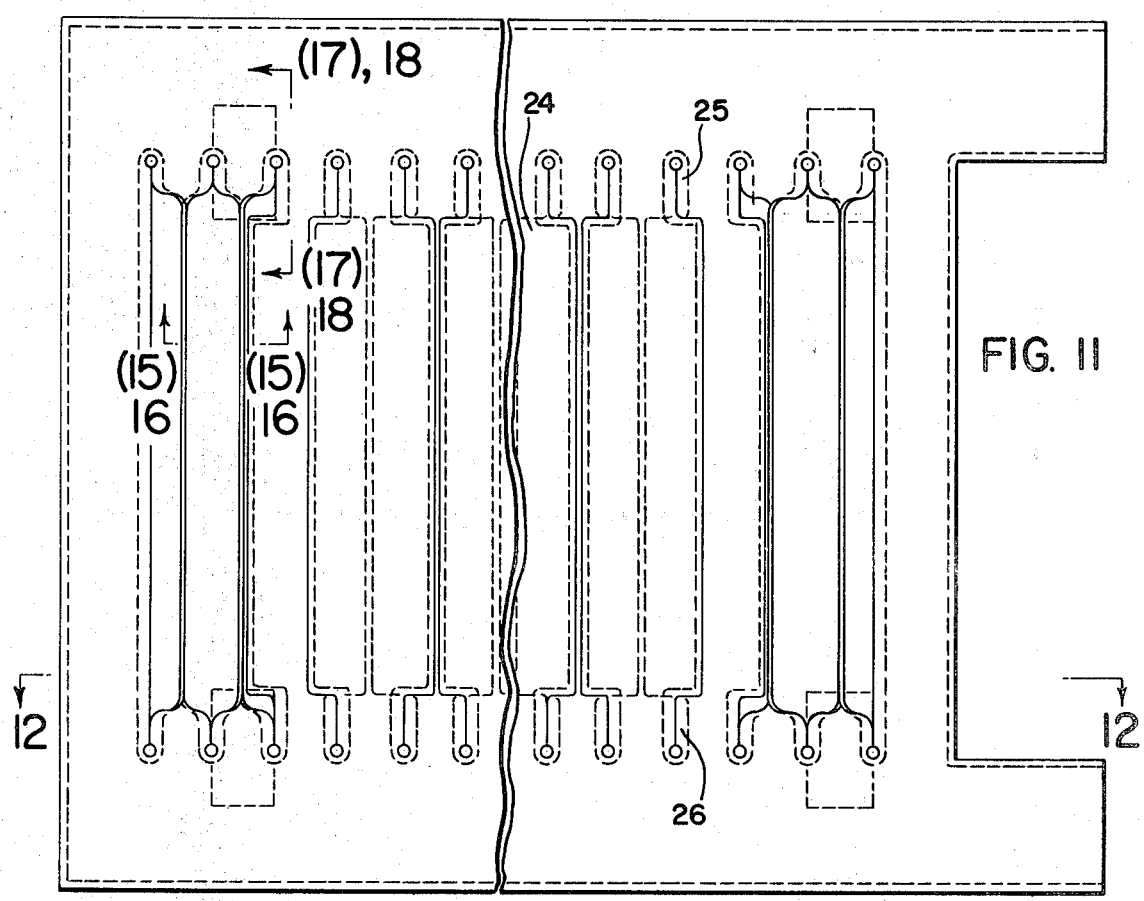
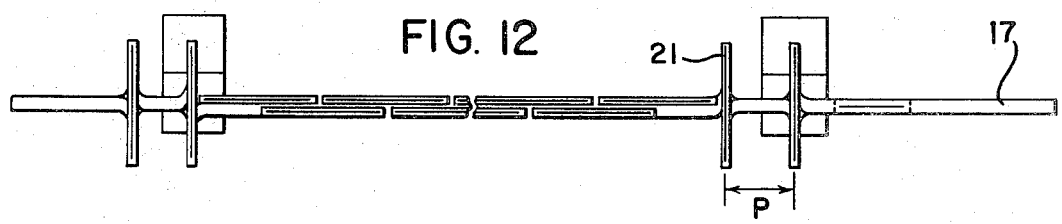
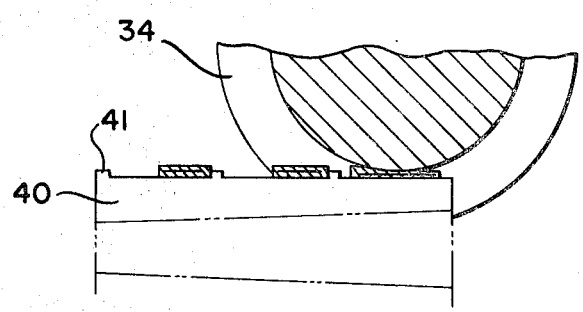
INVENTORS.
ANATOL MICHELSON &
MELVIN I. WEISS
BY
*Meyer, Tilberry & Body*
ATTORNEYS

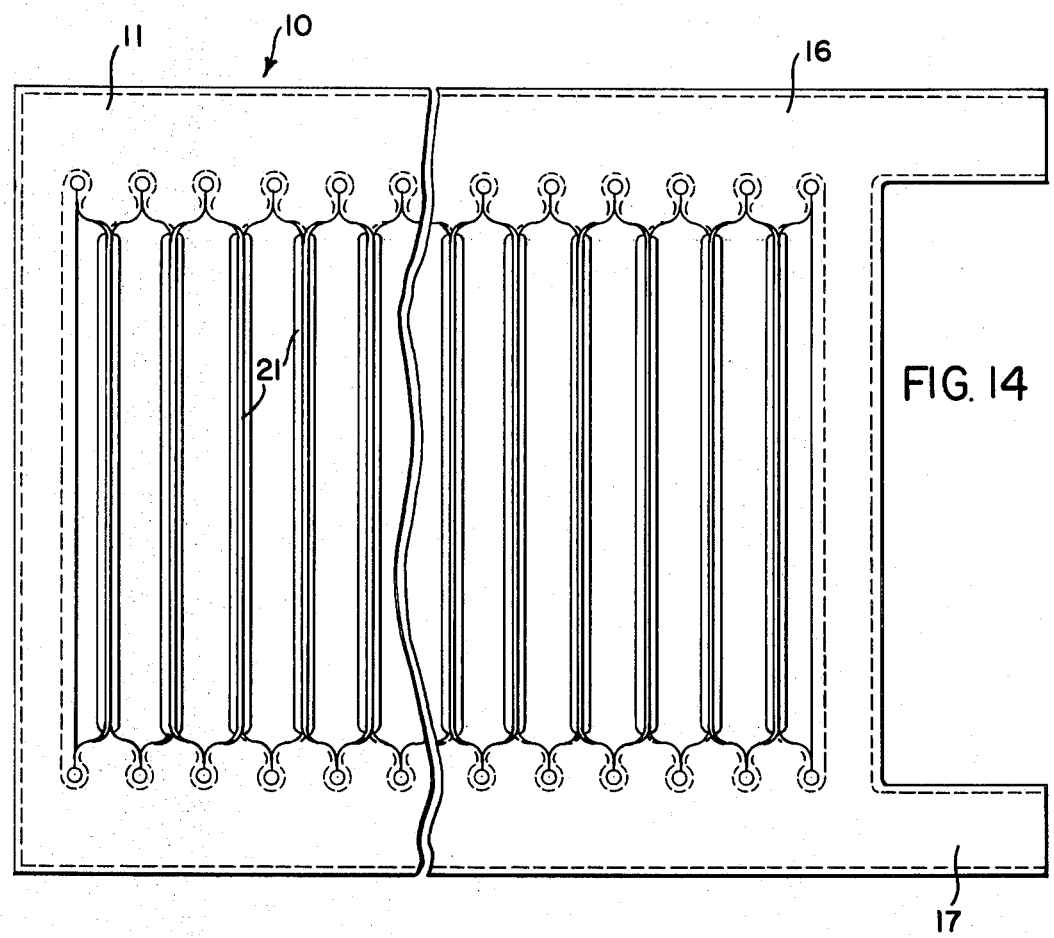
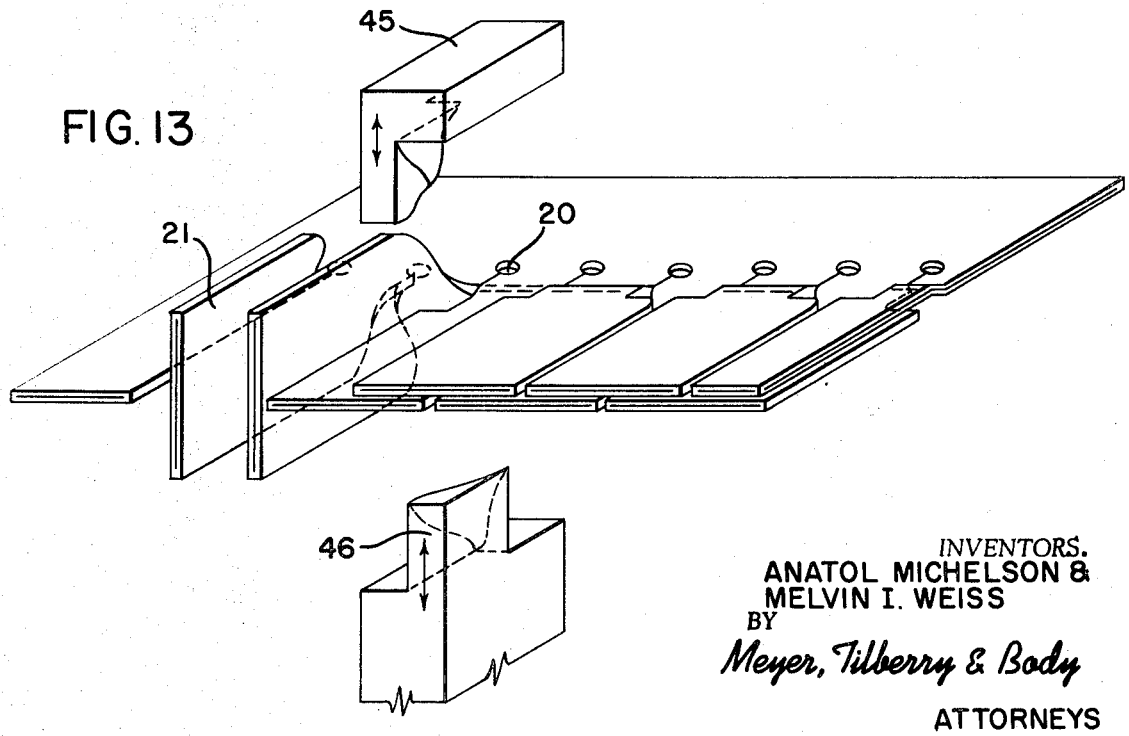

United States Patent Office 3,535,761
Patented Oct. 27, 1970

3,535,761
METHOD OF FABRICATING RADIATORS
Anatol Michelson, Glenolden, and Melvin I. Weiss, Broomall, Pa., assignors, by mesne assignments, to Gulf & Western Industrial Products Company
Filed Aug. 30, 1967, Ser. No. 664,481
Int. Cl. B21d 53/02
U.S. Cl. 29—157.3                                   6 Claims

ABSTRACT OF THE DISCLOSURE

A metal blank comprised of two sheets of metal pressure welded together along spaced rows with a series of elongated non-welded areas defined between the rows of weld is cut along the rows of weld to define a plurality of adjacent separated fins. The fins are displaced from the plane of the original blank with consecutive fins being displaced in opposite directions thereby to form two rows of fins separated by an opening extending along the length of the blank. A mandrel is inserted in the opening between the rows of fins and the fins are rolled to decrease their thickness and increase their width. The mandrel is then removed and the fins are flattened to form a substantially planar unit of two rows of flat fins. Thereafter, each fin is twisted to a position perpendicular to the plane of the blank and the blank is inflated.

---

This invention relates to the fabrication of a radiator and, more particularly, to a method for forming a radiator from a roll-bonded metal blank.

Until recently, there have been essentially two methods of fabricating radiators. The first method has employed a process of building up a radiator by welding various parts together to form the radiator unit. The other method has involved a casting procedure which necessarily required molds and a sophisticated core system. Both of these prior manufacturing methods are exceedingly time-consuming and, hence, relatively expensive.

More recently, it has been proposed to manufacture radiators from metal blanks consisting of two sheets of metal that have been pressure-welded together. These metal blanks are formed by a sandwich construction of two sheets of metal which are pressure-welded along spaced rows with a series of elongated non-welded areas defined between the areas of weld. Various patterns of non-welded areas may be formed in this manner with the non-welded areas providing passageways which, when the blank is inflated, may be used to contain a fluid medium. Several techniques have been proposed for manufacturing heat exchangers from metal blanks, such as those described, and it is a principal object of this invention to provide an improved method for forming a heat exchanger or radiator from such metal blanks.

In the design of heat exchangers or radiators, it is desirable to have a maximum radiation surface area available thereby to increase the efficiency of the radiator. Normally, this is accomplished by employing tubes or fins through which a fluid medium is circulated. In forming radiators by welding, or even by casting, the surface area of the tubes or fins may be varied within rather broad limits to optimize the efficiency of the unit. However, in attempting to form radiators from blanks of pressure-welded materials, a different situation exists. Thus, the metal blank is formed by two flat sheets of metal which are of a predetermined thickness. Each sheet must be thick enough to withstand, without rupture, the stresses imposed during the forming operations, as well as during inflation of the blank. As a result, the thickness of the metal imposes a practical limit on the area of the tubes or fins resulting from inflation of the metal blank.

Mechanical working of the inflated tubes, as well as the areas between the tubes, has been suggested as a means for increasing the radiation surface, but this has not provided a satisfactory method whereby a significant increase in the radiation surface might be obtained. It has also been suggested to insert secondary fins in the spaces between the tubes as a means of increasing the surface area. However, this approach is costly, both from the standpoint of increased labor costs, as well as material costs. Accordingly, it is an important object of this invention to provide an improved method whereby the radiation surface area of the tubes or fins may be substantially increased, thereby increasing the efficiency of the completed product.

A further object of this invention is to provide a method of fabricating a radiator from a roll-bonded metal blank whereby the surface area of the fins is substantially increased prior to inflation of the blank.

In its broadest aspect, the invention contemplates a method of producing a hollow radiator from a roll-bonded metal blank with the method contemplating rolling the fins to decrease the thickness and increase the width of each individual fin so that the subsequent inflation of the radiator results in fins having substantially greater surface area than was heretofore possible to obtain.

More specifically, the improved method contemplates the production of a hollow radiator from a roll-bonded metal blank in which the blank is slit along the length of the welded areas to define a plurality of separate fins with consecutive fins being displaced in opposite directions outwardly from the original plane of the blank to form two rows of fins separated by an opening which extends along the length of the blank. A mandrel is then inserted in the opening between the fins, and the fins are rolled to decrease the thickness and increase the width of each fin. The fins are then flattened and twisted to be in the proper orientation. The blank is then inflated to complete the formation of the hollow radiator.

Referring now to the drawings wherein like reference numerals indicate like parts in the various views:

FIG. 1 illustrates a metal blank, partially in section, of the type used in making a radiator according to the present invention;

FIG. 2 is a view similar to FIG. 1 after the metal blank has been punched;

FIG. 3 shows the blank after the slitting operation;

FIG. 4 is a sectional view taken along line 4—4 of FIG. 3;

FIG. 5 is a view taken along line 5—5 of FIG. 3;

FIG. 6 is a fragmentary view of a die performing the simultaneous slitting and bending of the fins to produce the configuration of FIGS. 3, 4, and 5;

FIG. 7 is a sectional view along line 7—7 of FIG. 6;

FIG. 8 is a schematic illustration of a mandrel inserted between the fins and the metal blank being passed through a rolling mill;

FIG. 9 is a sectional view showing an end elevation of the metal blank as it passes through the rolling mill;

FIG. 10 illustrates the metal blank as it is being flattened after the rolling operation;

FIG. 11 is a top plan view of the metal blank, partially in section, showing the blank as the fins are being twisted;

FIG. 12 is a sectional view along line 12—12 of FIG. 11;

FIG. 13 is a perspective view showing schematically the twisting of the fins;

FIG. 14 is a plan view of the metal blanks before inflation;

FIG. 20 is a fragmentary view of an alternate form of mandrel being used during the rolling operation of the fins.

Figure 19:
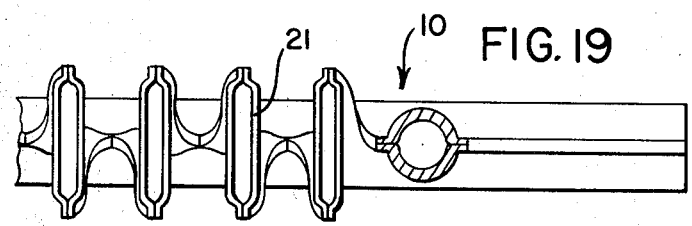
FIG. 19 is a fragmentary sectional view of the inflated radiator.
Figure 15:
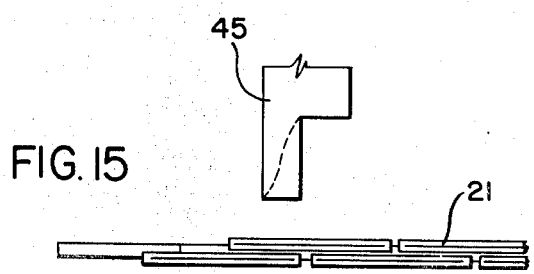
FIGS. 15, 16, 17 and 18 illustrate the sequence of steps in twisting the fins.
Figure 16:
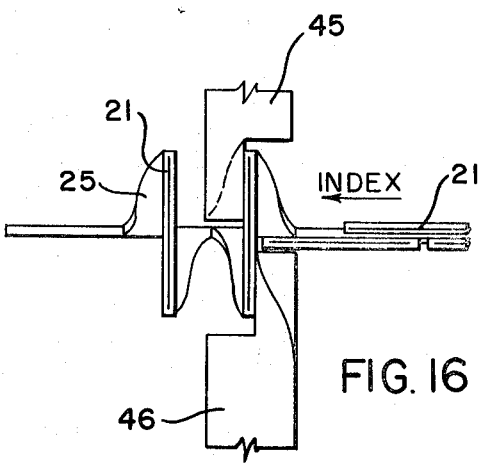
Figure 17:
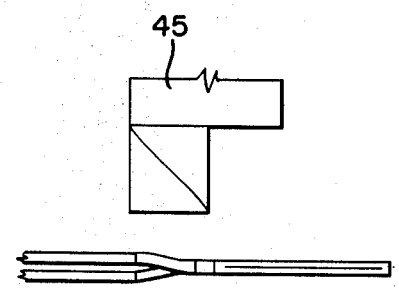
Figure 18:
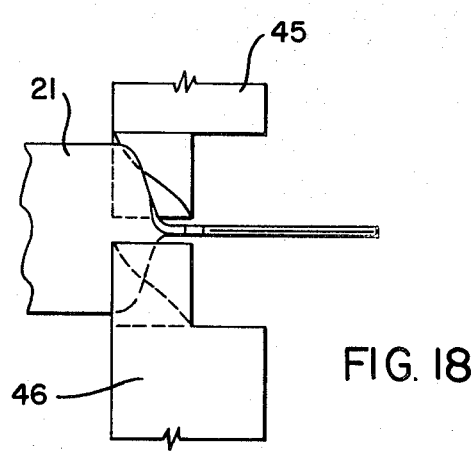

The formation of a hollow radiator, in accordance with the method hereinafter disclosed, contemplates a metal blank of the type which is a sandwich construction of sheet metal panels that are pressure-welded together at predetermined points. Panels of this general type are commercially available in various configurations and with various patterns of pressure-welding. The specific form of metal blank 10 contemplated by this invention is shown in FIG. 1 and includes two sheets of metal 11 and 12 which are generally shaped to the configuration of the radiator which is to be fabricated. The two sheets 11, 12 are connected by elongated strips of weld 13 with enlarged weld portions 14 at either end of each strip. The area 15 between each strip of weld may be inflated as by the introduction of fluid pressure, thereby to define hollow tubes or fins which are adapted to receive a fluid medium. The unbonded areas 16, 17 constitute, when inflated, headers for interconnecting the passages in the tubes or fins.

To form a radiator from the metal blank 10 in accordance with the instant method, it ordinarily is desirable that the enlarged areas 14 at either end of the weld or bond strips 13 are punched to define stress relieving openings 20, as shown in FIG. 2. Thereafter, the weld strips 13 are cut along the length of each strip intermediate the width of the strip to define a plurality of separate fins 21 which correspond to the unbonded areas 15. The fins 21, thus defined, are then displaced from the plane of the metal blank 10, as illustrated in FIG. 4. The displacement of the fins consists of bending consecutive fins in opposite directions from the plane of the metal blank, thereby forming two rows of fins with an oval-shaped opening 22 extending along the entire length of the metal blank. The slitting and bending of the fins 21 may be accomplished simultaneously on a conventional stamping press 30 by one set of dies 31, as illustrated in FIGS. 6 and 7.

After the fins 21 have been deformed to the configuration shown in FIGS. 4 and 5, a mandrel 33 is inserted in the oval space 22 between the fins, and the entire assembly is passed through a reversible rolling mill having rolls 34, which correspond to the shape of the mandrel 33. Only the fins 21 are subjected to the pressure of the rolls 34 with the headers 16, 17 being disposed external to the rolls, as illustrated in FIG. 9. Moreover, it should be noted that the mandrel 33 includes recesses 35, 36 at either end thereof to accommodate the end fins in the event that it is not desired to have these fins rolled.

As the fins are passed through the rolls 34, it will be appreciated that the wall thickness of each fin is reduced with a corresponding increase in the width of each fin. Although the amount of reduction of wall thickness of each fin may be varied within practical limits, it is preferred that the rolling of the fins increase the width of each fin by a factor of two, thereby effectively doubling the surface area available for radiation. However, it should be noted, with particular reference to FIG. 11, that only the central portion 24 of each fin is subjected to the rolling action of the rolls 34. The opposite ends 25, 26 of each fin are not passed through the rolls and remain of the original width and thickness. As a result, there are available with each fin, end portion which are capable of withstanding the stresses imposed by the subsequent twisting operation.

It will be appreciated that the precise type of mandrel employed may be varied with the mandrel 33 being of the collapsible type. There is illustrated in FIG. 20 an alternate form of mandrel, indicated by the reference numeral 40, which includes projections 41 on the outer periphery to restrict the flow of metal. With this type of mandrel, the need for trimming the edges of the fins is thereby eliminated.

Upon completion of the rolling operation, the mandrel 33 is withdrawn and the metal blank is placed in a die 44, which flattens the fins. Because of the rolling operation, the width of each fin has been increased to twice the spacing or pitch "p" between adjacent fins so that when the fins are flattened they cannot be returned to their original planar relationship. Rather, the flattening of the fins results in two parallel rows of fins, as shown in FIG. 10.

After the flattening operation has been completed, the only remaining operation in the forming of the radiator is the orientation of the fins perpendicular to the plane of the blank. This operation is schematically illustrated in FIGS. 11 to 18 wherein a pair of dies 45, 46 are employed. As illustrated, the dies twist each fin to a position perpendicular to the plane of the original blank 10. It should be noted in this regard that the dies 45, 46 act only on the unrolled portions 25, 26 at either end of each fin, thereby avoiding the imposition of stresses on the portion 24 which has a reduced wall thickness. The unrolled portions have substantial wall thickness which provides adequate material to withstand the twisting stresses placed on the material as the fins are repositioned. It will be appreciated that the specific means illustrated for twisting the fins is merely by way of example and other means may be employed.

After the fins have been twisted to a position perpendicular to the metal blank, the sole remaining step is the inflation of the blank to provide the hollow construction necessary to accommodate the fluid medium. This is accomplished in conventional manner through the introduction of fluid pressure into the passages of headers 16 and 17 which are in communication with the fins 21. The introduction of the fluid pressure expands the passageways through each of the fins and the headers to provide a construction of the type shown in FIG. 19.

It will be appreciated that the above-described method provides a process whereby the surface area of the fins 21 may be substantially increased over that which would normally be available with fabrication techniques heretofore employed. In achieving this result, a very significant aspect of this method is the rolling of the fins prior to inflation whereby it is possible to work with substantially flat metal surfaces, thereby permitting substantially conventional fabrication techniques to be employed. It will be appreciated that attempts to roll the fins after inflation, or by some other mechanical means increase the surface area of the fins, would pose very difficult problems. Moreover, by deflecting the fins after the slitting operation to a position wherein a mandrel may be inbe suggested to those in the art without departing from the invention as defined in the appended claims.

It will be appreciated that both the slitting and rolling steps involve relatively simple, conventional, fabricating techniques and do not require the design of complex, and expensive, equipment. Yet by employing these techniques on a metal blank of the type described, the production of more efficient radiators is greatly facilitated. Of course, a variety of modifications might be made in the method without departing from the spirit and scope of the invention. For example, the stress relieving openings 20 might be omitted in some circumstances. Moreover, the slitting operation might include the removal of some of the metal, as well as the separation of the fins, and it is intended that both approaches be encompassed. Other changes, in addition to the enumerated modifications, will be suggested to those in the art departing from the invention as defined in the appended claims.

Having disclosed our invention, we claim:

1. A method of producing a hollow radiator from a metal blank, the blank being characterized by a sandwich construction of two sheets of metal pressure-welded together along spaced rows with a series of elongated, non-welded areas defined between the rows of weld, the method comprising the steps of:

slitting the metal blank along and intermediate the width of the rows of weld to define a plurality of adjacent, separated fins;

displacing the fins from the plane of the original blank by bending consecutive fins in opposite directions outwardly from the original plane of the blank thereby to form two rows of fins separated by an opening extending along the length of the blank; compressing each fin by inserting a mandrel in the opening between the fins and rolling the fins to decrease the thickness and increase the width thereof thereby to increase substantially the surface area available for radiation;

orienting the fins at positions substantially perpendicular to the plane of the metal blank; and inflating the fins to define a hollow chamber therein.

2. The method of claim 1 wherein the step of orienting the fins perpendicular to the plane of the blank comprises the steps of:

flattening the rolled fins to form a substantially planar unit; and twisting each fin to a position perpendicular to the plane of the blank.

3. The method of claim 1 wherein the step of rolling the fins increases the width of each fin by approximately twice its original width.

4. The method of claim 1 wherein only the central portion of each fin is compressed.

5. The method of claim 1 wherein stress relieving apertures are formed at either end of the rows of the weld.

6. The method of claim 3 wherein the step of orienting the fins comprises the steps of:

flattening the rolled pins to form a substantially planar unit of two parallel rows of flat fins; and twisting the fins in the two rows to a position perpendicular to the plane of the blank.

References Cited

UNITED STATES PATENTS

| | | | |
|---|---|---|---|
| Re. 25,619 | 7/1964 | Adams | 29—157.3 X |
| 2,894,731 | 7/1959 | Wurtz | 113—118 X |
| 2,991,047 | 7/1961 | Bailys | 29—157.3 X |
| 3,121,940 | 2/1964 | Cospen | 29—157.3 |
| 3,224,503 | 12/1965 | Konanz | 165—183 X |

JOHN F. CAMPBELL, Primary Examiner

D. C. REILLY, Assistant Examiner

U.S. Cl. X.R.

113—118